H. E. McCART.
SPRING WHEEL.
APPLICATION FILED MAY 23, 1917.

1,253,066.

Patented Jan. 8, 1918.
2 SHEETS—SHEET 1.

Witnesses

Inventor
H. E. McCart
Attorney

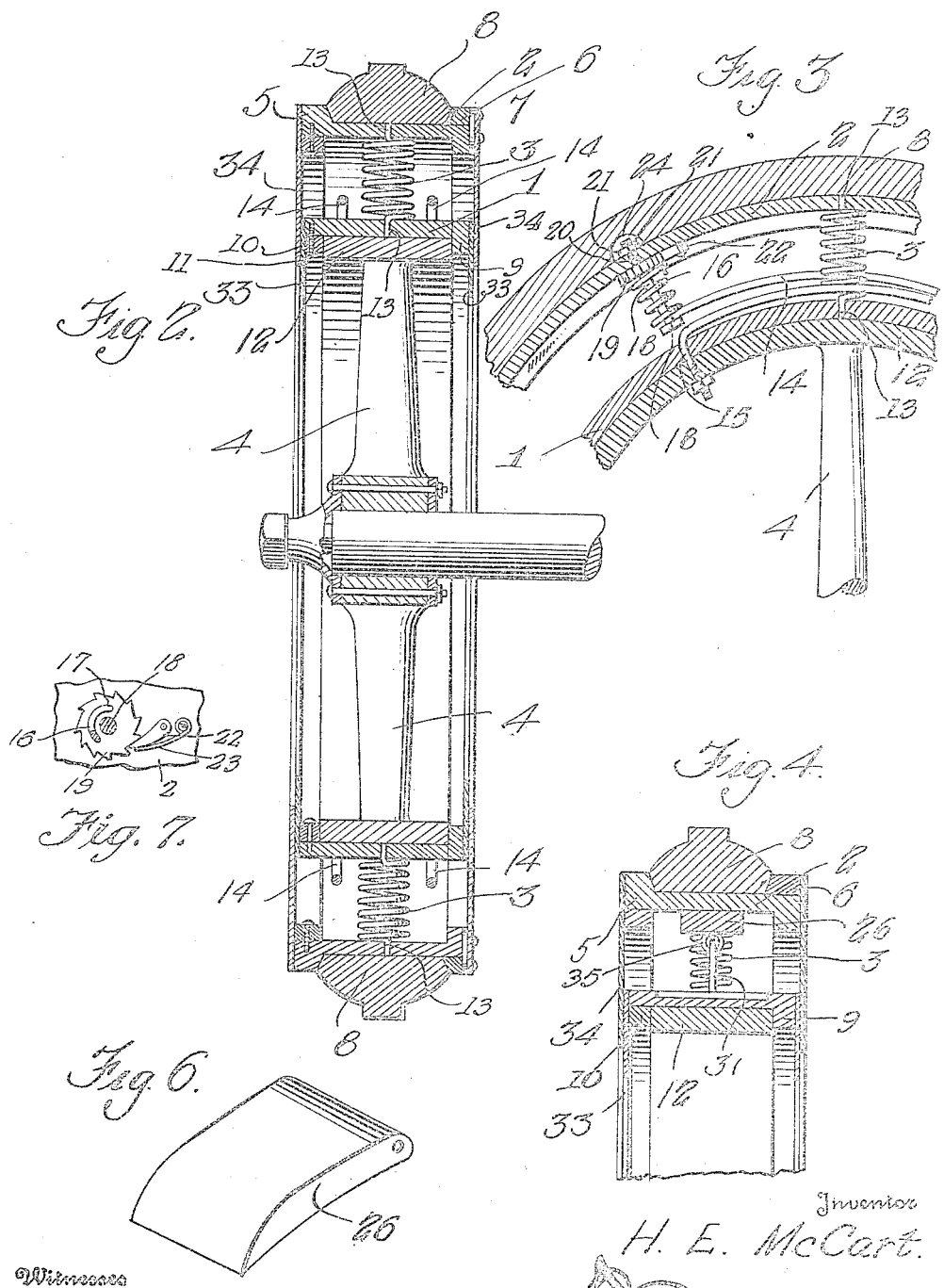

UNITED STATES PATENT OFFICE.

HENRY E. McCART, OF DELHI, LOUISIANA.

SPRING-WHEEL.

1,253,066.　　　　Specification of Letters Patent.　　Patented Jan. 8, 1918.

Application filed May 23, 1917. Serial No. 170,437.

*To all whom it may concern:*

Be it known that I, HENRY EVANS MC-CART, a citizen of the United States, residing at Delhi, in Richland parish and State of Louisiana, have invented certain new and useful Improvements in Spring-Wheels; and I do hereby declare the following to be a full, clear, and exact description of the invention, such as will enable others skilled in the art to which it appertains to make and use the same.

The invention relates to a spring wheel.

The object of the present invention is to improve the construction of spring wheels and to provide a simple, practical and efficient spring wheel of strong, durable and inexpensive construction designed for use on automobiles, trucks and various other motor vehicles and adapted to enable a solid rubber or other tire to be employed and capable of eliminating punctures and various other tire troubles and of absorbing and dissipating the strains and jars incident to the traveling of a vehicle over a rough road, whereby the body of the automobile or other vehicle is relieved of such strains and jars.

With these and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the claims, may be resorted to without departing from the spirit or sacrificing any of the advantages of the invention.

In the drawings:

Fig. 2 is a transverse radial sectional view of the wheel taken substantially on the line 2—2 of Fig. 1.

Fig. 3 is a detail longitudinal sectional view of a portion of the spring wheel, illustrating the construction of the resilient connecting members.

Fig. 4 is a transverse sectional view taken substantially on the line 4—4 of Fig. 1, the resilient connecting members being omitted.

Fig. 6 is a detail view of the dog of the automatic safety clutch.

Fig. 7 is a detail sectional view, illustrating the ratchet mechanism for securing the springs of the resilient connecting members in their adjustment.

Like numerals of reference designate corresponding parts in all the figures of the drawings.

Figure 1:
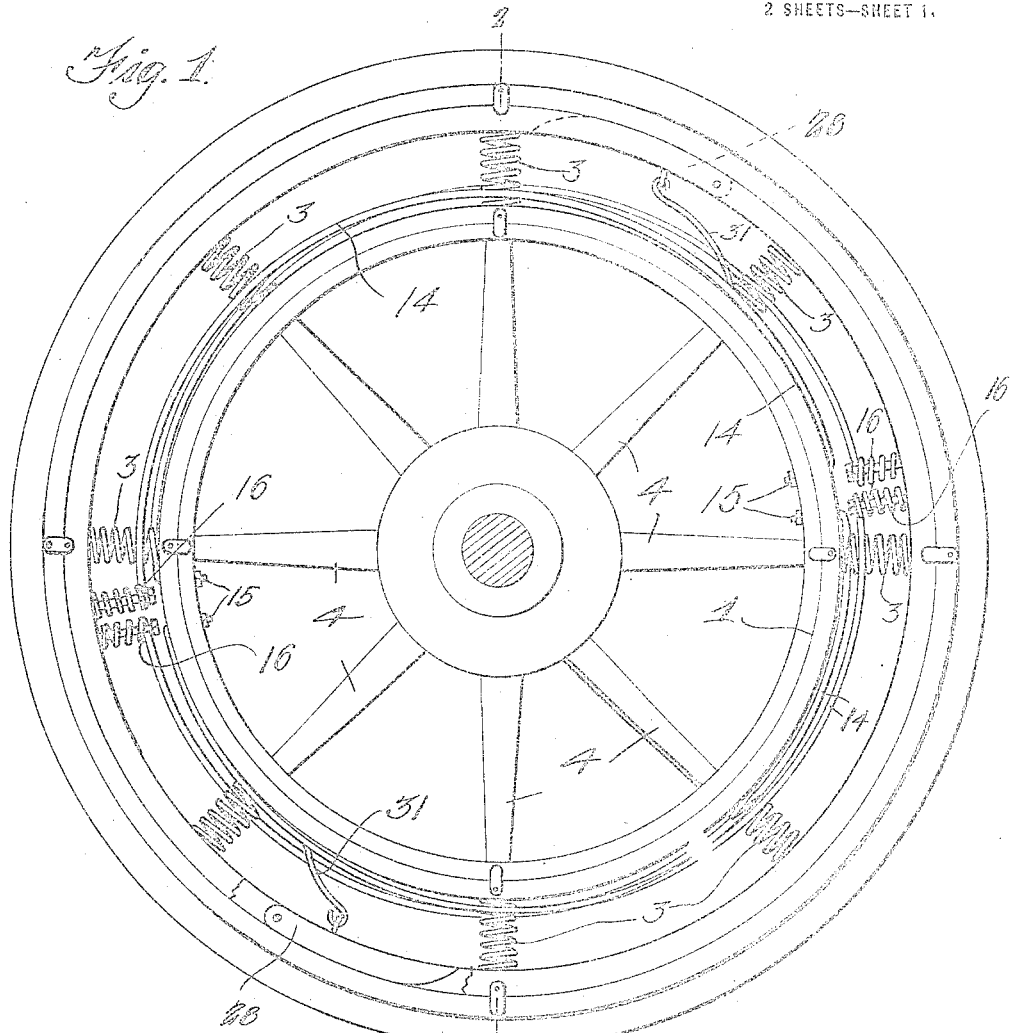
Figure 1 is a side elevation of a spring wheel constructed in accordance with this invention, the mud guard being removed.
Figure 5:
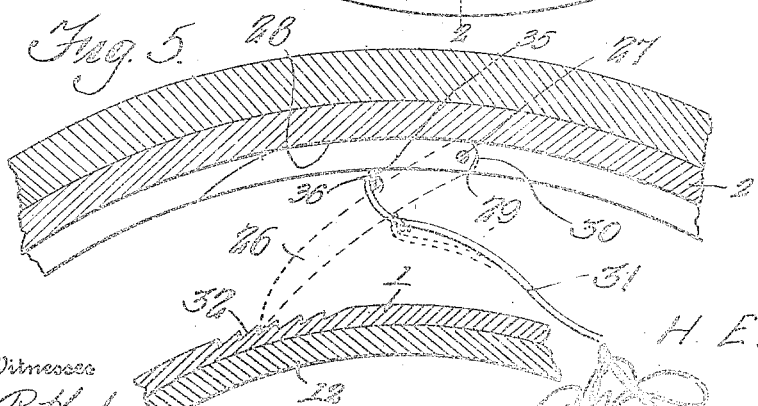
Fig. 5 is a detail sectional view taken longitudinally of the wheel, illustrating the construction of the safety automatic catch.

In the accompanying drawings, in which is illustrated the preferred embodiment of the invention, the spring wheel comprises in its construction an inner ring or member 1, an outer rim 2 and cushioning springs 3, the inner ring and the outer rim with the intervening cushioning springs forming an outer spring structure which is adapted to be readily applied to an ordinary wheel 4 as a substitute for a pneumatic tire, and the outer wheel structure may be readily applied to any ordinary automobile wheel or wheel of a similar conveyance. The outer rim 2 is provided at one side with an annular flange 5 and it has a detachable retaining ring 6 at the opposite side secured in place by clip plates 7 and arranged in spaced relation with the flange 5 to provide an annular channel for the reception of a tire 8 of rubber or any other suitable material. Any desired construction of tire may of course be employed and may be readily placed on and removed from the outer rim.

The inner ring is provided at its inner periphery with an annular flange 9 and it has a detachable retaining ring 10 at the opposite side secured in place by screws 11 or other suitable fastening means and forming an inner groove or channel with the said annular flange to receive the felly 12 of the inner wheel. The detachable clip plates enable the spring wheel structure to be readily mounted on and removed from an ordinary wheel. The springs 3 may be of any desired number and size to suit the character of vehicle to which the spring wheel is to be applied and their terminals 13 may be secured to the rim and the inner ring by any suitable means.

In order to limit the relative rotary movement of the inner ring and the outer rim, the wheel is equipped with resilient connecting members 14 preferably arranged in pairs and located at opposite sides of the wheel, but any desired number of such resilient connecting members may of course be employed. The members of each pair of resilient connecting members are preferably reversed, as shown, and each of the said resilient connecting members is constructed of steel or other resilient material and has one end 15 piercing the inner ring and suitably secured to the same. The other end of the resilient connecting member is coiled to form a spring 16 which has its free terminal 17 connected with an adjusting device comprising a screw 18 carrying a ratchet wheel 19 and having a threaded portion 20 piercing the rim 2 and engaged by a nut 21 which locks the screw in its adjustment. The ratchet wheel is preferably formed integral with the screw, but it may be rigidly connected therewith in any other manner, and it is arranged at the inner face of the rim and is engaged by a pawl or dog 22 which is maintained in engagement with the ratchet wheel 19 by a spring 23. The outer end of the screw may be provided with a groove 24 to receive the blade of a screw driver or other tool for rotating the screw to regulate the tension of the spring 16 which has its terminal 17 secured to the ratchet wheel 19. Various other locking means may of course be employed for securing the spring 16 at the desired tension and the spring 16 will resist longitudinal movement of the connecting member. Any relative rotary movement of the inner ring and the outer ring incident to starting, stopping, backing or the like will be resisted by the resilient connecting member, but in case of a sudden severe strain from any cause the spring wheel may be locked to prevent excessive relative rotary movement of the inner and outer portions, by means of a safety clutch consisting of a pawl or dog 26 pivoted at 27 in a recess 28 in the rim and having a rounded end 29 fitting the wall 30 of the recess to form a knuckle joint to relieve the pivot 27 of strain. The pawl or dog is connected by a link 31 with the inner ring and a relative rotary movement of the inner ring will pull upon the link 31 and swing the pawl or dog inwardly into engagement with one of a plurality of ratchet teeth 32 of the inner ring. When the pawl or dog is engaged with the ratchet teeth 32 the rotation of the inner portion of the wheel will be transmitted through the pawl or dog to the outer portion of the wheel and further relative rotary movement of the inner ring will be prevented and the springs 3 will thereby be relieved of torsional strain incident to torque. The link 31 is preferably resilient and the clutches may be reversely arranged so as to operate in forward and backward rotary movements of the wheel.

The wheel is designed for use on both the front axle and driving axle of automobiles, trucks and motor vehicles and it is equipped with inner and outer side plates or rings 33 and 34 secured to the inner ring and the outer rim and slidably fitting each other and adapted to prevent access of mud to the space between the inner and outer members of the device.

What is claimed is:

1. A spring wheel including inner and outer annular sections, cushioning springs interposed between the sections, a resilient connecting member extending longitudinally of the said members and connected with the same and provided with a terminal spring adapted to be placed under tension by the relative circumferential movement of the said sections, and manually adjustable means connected with the spring for varying the tension of the same.

2. A spring wheel including inner and outer annular sections, cushioning springs interposed between the sections, reversely arranged resilient connecting members each secured at one end to the inner section and provided at the other end with a coiled spring, and an adjusting device connecting the coiled spring with the outer section of the spring wheel for controlling the tension of the spring of the connecting member.

3. A spring wheel including inner and outer annular sections, cushioning springs interposed between the sections, and reversely arranged connecting members extending longitudinally of the said sections and located in the space between the same, each member being secured at one end to one of the sections and provided at the other end with a radially arranged coiled spring, and means for adjustably connecting the free terminal of the coiled spring with the other section for controlling the tension of the spring of the connecting member.

4. A spring wheel including inner and outer annular sections, cushioning springs interposed between the sections, and connecting members extending longitudinally of the said sections and each connected at one end with one of the sections and provided at the other end with a coiled spring, and an adjusting device for each of the springs of the said members, said adjusting device comprising a stem on which the coiled spring is mounted, means carried by the stem for connecting the same with the springs, and means for locking the stem in its rotary adjustment.

5. A spring wheel including spaced inner and outer sections, cushioning springs, and an automatic clutch consisting of a pawl or dog mounted on one of the sections and connected with the other section and arranged to be carried into engagement with the same by an excessive relative rotary movement of the said sections.

6. A spring wheel including an inner section provided with a tube, an outer section spaced from the inner section, twisting springs interposed between the sections, a pawl or dog pivoted to the outer section and arranged to swing inwardly into engagement with the said tube, and means for connecting the pawl or dog with the inner section for operating the said pawl or dog under excessive relative movement of the said section.

In testimony whereof I affix my signature in presence of two witnesses.

HENRY E. McCART.

Witnesses:
R. E. WALLANK,
B. SKIDMORE.

Copies of this patent may be obtained for five cents each, by addressing the "Commissioner of Patents, Washington, D. C."